United States Patent
Kwon et al.

(10) Patent No.: US 7,865,620 B2
(45) Date of Patent: Jan. 4, 2011

(54) WEB SERVER AND WEB SERVICE METHOD THEREOF

(75) Inventors: O-shik Kwon, Seoul (KR); Ki-yong Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 11/829,367

(22) Filed: Jul. 27, 2007

(65) Prior Publication Data

US 2008/0162727 A1    Jul. 3, 2008

(30) Foreign Application Priority Data

Jan. 3, 2007    (KR) ............... 10-2007-0000559

(51) Int. Cl.
*G06F 15/16* (2006.01)

(52) U.S. Cl. .................. 709/247; 709/203; 709/221; 709/226; 709/225; 707/693

(58) Field of Classification Search ............. 709/203, 709/218, 219, 224, 246, 247, 221, 225, 226; 715/234, 236, 238, 239; 707/693

See application file for complete search history.

(56) References Cited

U.S. PATENT DOCUMENTS

| 6,834,297 | B1 * | 12/2004 | Peiffer et al. ............. 709/219 |
| 7,031,178 | B2 * | 4/2006 | Parkin ..................... 365/80 |
| 7,188,214 | B1 * | 3/2007 | Kasriel et al. ........... 711/118 |
| 7,484,007 | B2 * | 1/2009 | Bannoura et al. ........ 709/247 |
| 7,587,669 | B2 * | 9/2009 | Rana ....................... 715/242 |

* cited by examiner

*Primary Examiner*—Larry Donaghue
*Assistant Examiner*—Mohammad A Siddiqi
(74) *Attorney, Agent, or Firm*—Jefferson IP Law, LLP

(57) ABSTRACT

A web server that compresses a web resource and provides the compressed web resource, the web server including: a compression unit to substitute strings including combinations of symbolic characters of different types for strings of a file of a web resource to compress the strings; a storage unit to store compression information of the web resource; and a control unit to execute the web resource according to the compression information stored in the storage unit if a web service is requested, and to provide the requested web service. Accordingly, the response speed of the web server is improved, and a web resource program is protected.

17 Claims, 9 Drawing Sheets

FIG. 4A

| Symbol | Description | Example |
|---|---|---|
| ^ (caret) | Indicate start of line or string | ^aaa (if aaa is included at start of string, it means truth, while if not, it means falsehood) |
| $ (dollar) | Indicate end of line or string | aaa$ (if aaa is included at end of string, it means truth, while if not, it means falsehood) |
| . (period) | Indicate certain character | ^a, c (if abc, adc, aZc are included at start of string, it means truth, while if aa is included, it means falsehood) |
| | | a..b$ (if aaab, abbb, azzb are included at end of string, it means truth) |
| [] (bracket) | Indicate set or range of character. "_" between two characters indicate range | If "^" precedes in [ ], it indicates "not" |
| {} (brace) | Numeral in { } indicates frequency or range of appearance of preceding character | a{3} (repetition of 'a' three times) |
| * (asterisk) | String in which preceding character just prior to "*" appears zero time or several times | a..b$ (if aaab, abbb, azzb are included at end of string, it means truth) |
| + | String in which preceding character just prior to "+" appears once and more | ab+c (since 'b' is included once or several times, it corresponds to abc, abcbddddd, abbd, abbbbbbc, (ac is not included)) |
| ? | String in which preceding character just prior to "?" appears zero time or once | ab?c (since 'b' is included zero time or once, it corresponds to abc, abcd only) |
| () (parenthesis) | Is used when patterns are grouped in regular expression | |
| \| (bar) | Indicates 'or' | a\|b\|c (one among a, b, c, that is, equal to [a-c]) |
| \ (backslash) | May be used with preceding 'W' when it is desired to treat special characters as characters in regular expression | filenameW.ext (indicates "filename.ext") |

FIG. 4B

| | |
|---|---|
| [abc] | (a character among a, b, c, it is equal to "[a-c]") |
| [Yy] | (Y or y) |
| [A-Za-z0-9] | (All alphabets and numerals) |
| [-A-Z] | ("-" (hyphen) and all capital letters) |
| [^a-z] | (characters except for small letters) |
| [^0-9] | (characters except for numerals) |
| [[:digit:]] | (equal to [0-9]) |
| a{3,} | ('a' is repeated three times and more, it indicates aaa, aaaa, aaaaa, ...) |
| a{3,5} | (corresponds to aaa, aaaa, aaaaa only) |
| ab{2,3} | (corresponds to abb, abbb only) |
| [0-9]{2} | (two-figure numeral) |
| doc[7-9]{2} | (corresponds to doc77, doc87, doc97, ...) |
| [^zz]{5} | (corresponds to five-character strings excluding Z and z: abcde, ttttt, ...) |
| .{3,4}er | (corresponds to Peter, mother, ... since the string includes three or four characters before 'er') |
| .* | (corresponds to certain string and blank string since no preceding character exists) |
| ab* | (corresponds to string including one or more characters since the preceding character is ".", blank string is not allowed) |
| a* | (corresponds to a, accc, abb, abbbbbb, ... since 'b' is included zero time or several times) |
| | (corresponds to k, kdd, sdfrrt, a, aaaa, abb, blank string since 'a' is included zero time or several times) |
| doc[7-9]* | (corresponds to doc7, doc77, doc777, doc778989, doc, ...) |
| [A-Z].* | (corresponds to string composed of capital letters only) |
| like.* | (corresponds to string in which zero or at least one character is added to 'like'; like, likely, liker, likelihood, ...since the preceding character is '.') |
| ab+ | (corresponds to ab, abccc, abb, abbbbbb, .. since 'b' is included once or several times) |
| like.+ | (corresponds to string in which one or more characters are added to 'like'; likely, liker, likelihood, ...since the preceding character is '.', but it is not allowed 'like') |
| [A-Z]+ | (corresponds to string composed of capital letters only) |
| yes\|Yes | (corresponds to either 'yes' or 'Yes', equal to [yY]es) |
| korea\|japan\|chinese | (corresponds to one of Korea, Japan, China) |
| [\?\[\\\]] | (corresponds to one among '?', '[', '\', ']') |

FIG. 5

```
function=func[A-Z][a-zA-Z0-9]*
variable=var[A-Z][a-zA-Z0-9_]*
div_id=div[A-Z][a-zA-Z0-9_]*
```

FIG. 6

(a) a0 a1 ... a9 b0 b1 ... b9 ... z0 z1 ... z9
(b) aa0 aa1 ... az9 ba0 ... zz9
(c) aaa0 aaa1 ... azzz9 baa0 ... zzz9
⋮

FIG. 7A

```
function funcSetCurrentChannel(index, varProgramTitle, varProgramStartTime, varProgramEndTime, desc) {
    if(varProgramTitle!=''){
        funcSetChannelData(index, CONST_CCH_Title.varProgramTitle);
    }
    if(varProgramStartTime!=''){
        funcSetChannelData(index, CONST_CCH_StartTime. varProgramStartTime);
    }
    if(varProgramEndTime!=''){
        funcSetChannelData(index, CONST_CCH_EndTime. varProgramEndTime);
    }
    In case of additional information, data is not put therein due to errors
    frequently occurring in browser, but a space is put therein.
    if(desc!=''){
        funcSetChannelData(index, CONST_CCH_EndTime. varProgramEndTime);
    }
}
```

```
function
v8(index,x6,z8,ai9,desc){if(x6!='')}{aj1(index,ac5,x6);}if(z8!='')aj1(index,o4,z8);}if(ai9!='')}{aj1(index,t9ai9);}if(desc1='')}{aj1(index,k2,' ');}}
```

71'  72'

WEB SERVER AND WEB SERVICE METHOD THEREOF

CROSS-REFERENCE TO RELATED APPLICATIONS

This application claims all benefits accruing under 35 U.S.C. §119 from Korean Application No. 2007-559, filed on Jan. 3, 2007, in the Korean Intellectual Property Office, the disclosure of which is incorporated herein by reference.

BACKGROUND OF THE INVENTION

1. Field of the Invention

Aspects of the present invention relate to a web server and a web service method thereof, and more particularly, to a web server and a web service method thereof that compress and provide a requested web resource.

2. Related Art

The Internet has experienced massive growth in recent years. The emergence of the World Wide Web has enabled millions of Internet users throughout the world to easily download web pages containing text, graphics, video, and/or sound data via host computers or wireless devices at home, work, or from remote locations. These web pages are often large in size. As a result, a long period of time is required to download these web pages, causing the user delay and frustration. Often times, users have to abandon the requested web page due to the delay and move on to other web pages, resulting in lost revenue and exposure for many commercial web sites.

The delay in downloading a web page may be caused by a number of factors. On a server side, a large volume of page requests may overload the capacity of the server and result in unanswered requests or late answers to requests. Within a computer network, network congestion and limited bandwidth may cause delay in the transmission of data. Particularly, an embedded web server that is mounted on a small network device performs poorly as compared to a web server developed for a general computer, such as a personal computer or a workstation.

FIG. 1 is a view of a typical network data transmission system. In particular, FIG. 1 illustrates a network data transmission system and a method thereof described in U.S. Pat. No. 6,834,297. As shown in FIG. 1, the network data transmission system 10 described has one or more specified machines 12 positioned in front of web servers 11 and accessed by client terminals 13, via a network such as a wide area network (WAN) 14. A managing server 15 is also included to enable an administrator (i.e., network manager) to manage the network data transmission system 10. Each machine 12 serves as a proxy of the web servers 11, and performs a load balancing, downloading of a resource from the web server 11, compressing of content, and so forth. In this case, the speed of communications with the respective web server 11 is increased by using a protocol of a lower level than a transmission control protocol (TCP). Particularly, in the case of providing the web resource, the machine 12 compresses an image (or the like), and then changes the image (or the like) uniform resource locator (URL) in the generic tag markup language (GTML) to a compressed one in order to provide the compressed image URL. When the browser performs a rendering, the hypertext markup language (HTML) removes various kinds of tags, attributes of the tags, and various kinds of annotations that are unnecessary.

In the system disclosed in U.S. Pat. No. 6,834,297, the web server 11 mainly compresses the HTML and does not compress JavaScript. In the case where JavaScript is used (such as when the page has a dynamic user interface), the size of the JavaScript code is generally larger than that of the HTML code. However, the system disclosed in U.S. Pat. No. 6,834,297 has a problem in that it does not compress the JavaScript. In addition, since the compression of content is not the role of the web server 11 but is performed by another server in the web server stage, it is difficult to apply the system to the embedded device.

SUMMARY OF THE INVENTION

Several aspects and example embodiments of the present invention provide a web server and a web service method thereof that can effectively reduce the size of files by substituting strings including combinations of symbolic characters of different types for strings of a file of a web resource.

Additional aspects and/or advantages of the invention will be set forth in part in the description which follows and, in part, will be obvious from the description, or may be learned by practice of the invention.

In accordance with an example embodiment of the present invention, a web server comprises: a compression unit to substitute strings including combinations of symbolic characters of different types for strings of a file of a web resource to compress the strings; a storage unit to store compression information of the web resource; and a control unit to execute the web resource according to the compression information stored in the storage unit if a web service is requested, and to provide the requested web service.

According to an aspect of the present invention, the file may be at least one of a hypertext markup language (HTML) file and a JavaScript file.

According to an aspect of the present invention, the text compression unit may compress a JavaScript function name and a variable name included in the JavaScript file.

According to an aspect of the present invention, the text compression unit may compress a tag ID included in the HTML file.

According to an aspect of the present invention, the control unit may control the compression unit to compress the file of the requested web resource if the compression information corresponding to the requested web resource is not stored in the storage unit.

According to an aspect of the present invention, the compression unit may substitute the strings including the combinations of the symbolic characters of an English character type and the symbolic characters of a numeral type for the strings of the file.

According to an aspect of the present invention, the web server may be an embedded web server included in a device of an expandable home theater (XHT) network.

In accordance with another example embodiment of the present invention, a method of providing a web service for a web server that compresses and provides a requested web resource comprises: substituting strings including combinations of symbolic characters of different types for strings of a file of the web resource to compress the strings; storing compression information of the web resource; and executing the web resource according to the compression information stored in the storage unit if the web service is requested, and providing the requested web service.

According to an aspect of the present invention, the file may be at least one of an HTML file and a JavaScript file.

According to an aspect of the present invention, the substituting may include compressing a JavaScript function name and variable name included in the JavaScript file.

According to an aspect of the present invention, the substituting may include compressing a tag ID included in the HTML file.

According to an aspect of the present invention, the method of providing a web service may further include confirming whether compression information corresponding to the requested web resource is stored; and compressing the file of the requested web resource if the compression information is not stored.

According to an aspect of the present invention, the substituting may include substituting the strings including the combinations of the symbolic characters of an English character type and the symbolic characters of a numeral type for the strings of the file.

According to an aspect of the present invention, the web server may be an embedded web server included in a device of an XHT network.

In accordance with still another example embodiment of the present invention, a web server that provides a requested web resource comprises: a compression unit to replace first strings of a file of the web resource with second strings including combinations of symbolic characters of different types in order to compress the first strings; and a control unit to provide the web resource having the second strings when the web resource is requested.

In accordance with another example embodiment of the present invention, a method of providing a web service for a web server that compresses and provides a requested web resource comprises: replacing first strings of a file of the web resource with second strings including combinations of symbolic characters of different types in order to compress the first strings; and providing the compressed web resource having the second strings when the web resource is requested.

In accordance with yet another example embodiment of the present invention, a web server that provides a requested web resource comprises: a compression unit to replace first strings of a JavaScript file of the web resource with second strings that are smaller than the first strings; and a control unit to provide the web resource having the second strings when the web resource is requested.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIGS. 4A and 4B are views illustrating examples of regular expressions generally used according to an example embodiment of the present invention;

FIG. 5 is a view illustrating an example of a regular expression of a function name and a variable name of a JavaScript file and a tag ID of an HTML file according to an example embodiment of the present invention;

FIG. 6 is a view illustrating examples of symbolic character combinations that can be used as compression variables according to an example embodiment of the present invention;

FIGS. 7A and 7B are views illustrating examples of JavaScript forms before and after the compression is applied according to an example embodiment of the present invention;

DETAILED DESCRIPTION OF THE EMBODIMENTS

Figure 1:
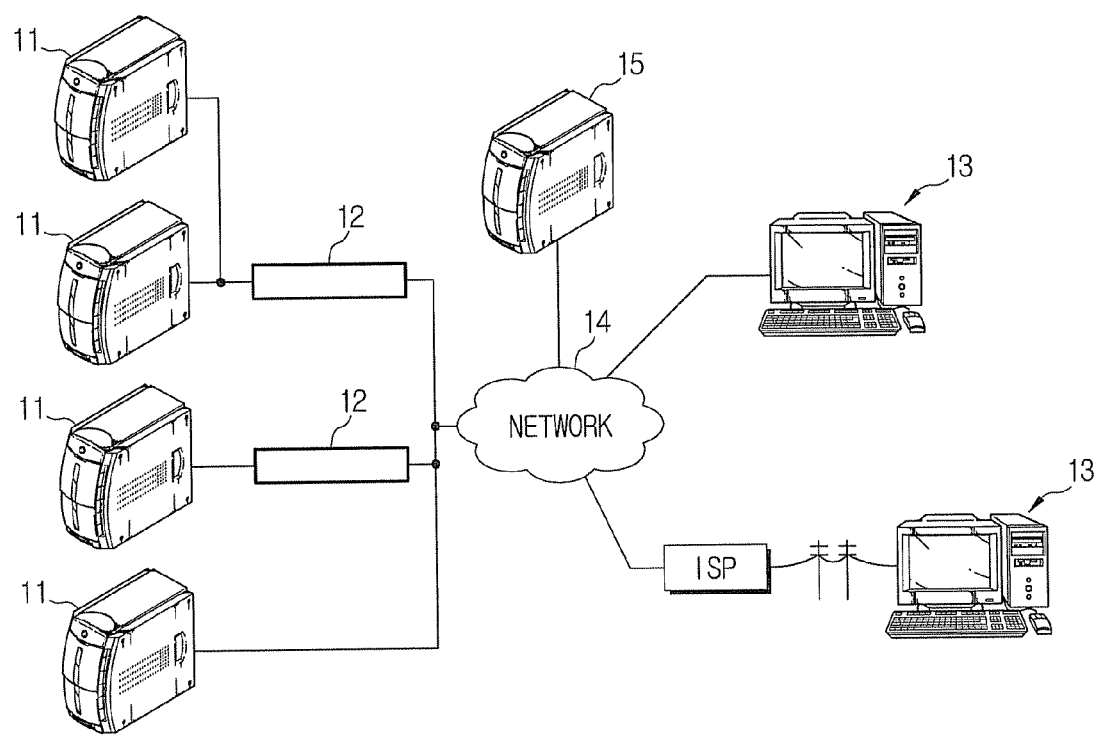
FIG. 1 is a view of a typical network data transmission system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
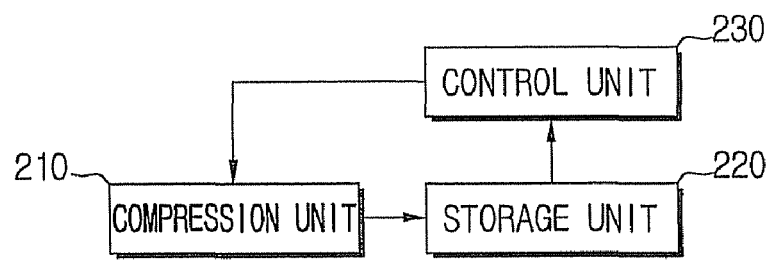
FIG. 2 is a block diagram illustrating the construction of a web server according to an example embodiment of the present invention.

FIG. 2 is a block diagram illustrating the construction of a web server 200 according to an example embodiment of the present invention. Referring to FIG. 2, the web server 200 includes a compression unit 210, a storage unit 220, and a control unit 230.

The web server 200 may be a general web server or an embedded web server. Particularly, aspects of the present invention can be implemented by an embedded web server built into a device included in an expandable home theater (XHT) network. Here, the XHT network is a network system that uses an XHT communication method. The XHT communication method is a technology that can control video and audio devices connected to a digital TV (DTV) or several digital TVs by using an IEEE 1394 cable. An IEEE 1394 cable can stably transfer a plurality of high definition (HD) signals over 1394 protocol using an Internet protocol (IP) that is the communication standard mainly used in the Internet.

Figure 3:
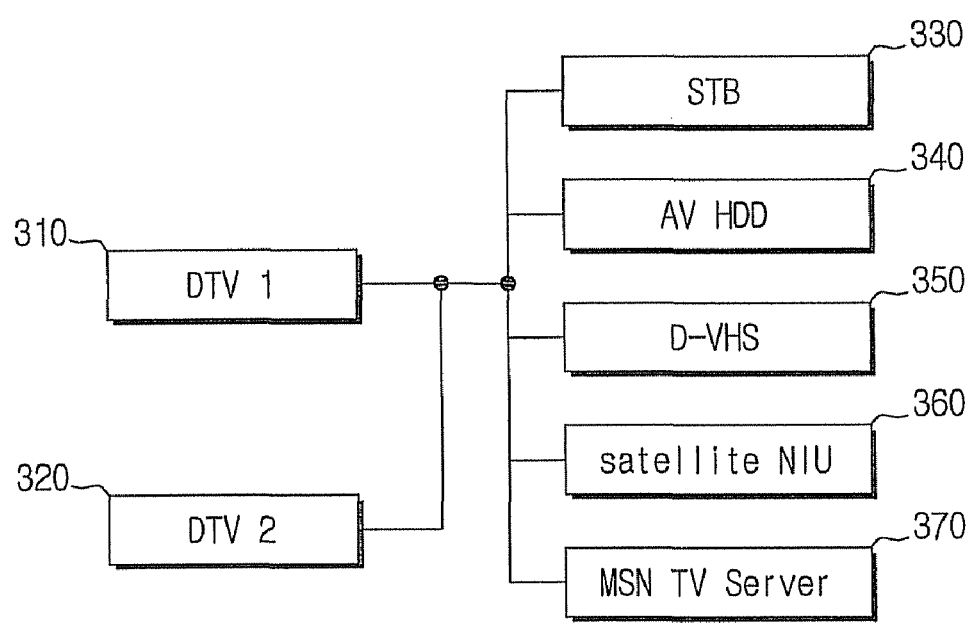
FIG. 3 is a block diagram illustrating the construction of an XHT network system for connecting a plurality of devices based on an XHT communication method according to an example embodiment of the present invention.

FIG. 3 is a block diagram illustrating a construction of an XHT network system for connecting a plurality of devices based on an XHT communication method according to an example embodiment of the present invention. Referring to FIG. 3, devices are connected via an IEEE 1394 cable. These devices include a DTV 1 310, a DTV 2 320, a set-top box (STB) 330, an audio/video hard disk drive (AV HDD) 340, a digital-video home system (D-VHS) 350, a network interface unit (NIU) 360, an MSN TV server 370, and so forth. Here, the D-VHS 350 is a high-capacity recorded video for a DTV recording, and the NIU 360 is a low-priced network interface unit developed on the basis of the XHT technology. The D-VHS 350 is in the form of a memory card, and thus can be easily modified in accordance with the receiving type (such as a ground wave type, a satellite type, a cable type, etc.), thereby lessening a financial burden on broadcast providers. The NIU 360 is an important element that constitutes the XHT together with the digital TV. The NIU 360 is a digital device that makes it possible to provide a high-quality video/audio service at minimum cost to cope with the rising popularity of the digital TV market.

IEEE 1394 is a new serial interface standardized by the Institute of Electrical and Electronics Engineers (IEEE). Apple Computer, Inc. first developed an interface, called FireWire, as the standard to substitute for a small computer system interface (SCSI), and the IEEE formally adopted the standard in 1995. The IEEE 1394 has been developed as an interface for connecting home devices (such as a video camera, an audio appliance, a TV, a video cassette recorder (VCR), etc.), in addition to computer peripheral devices, to a personal computer (PC). The IEEE 1394 currently has three data transfer rates (100 MB per second, 200 MB per second, and 400 MB per second).

Using this XHT communication method, a person in a bedroom can view a digital broadcast on a DTV not provided with a digital broadcasting receiver by using a digital broadcast receiving function of a DTV located in a living room, for example. In the same manner, even in the case where only a DTV located in a loving room is provided with a DVD player, a home theater, a camcorder, and so forth, a person in another room can access content from the DTV (such as a movie, music, a game, educational content, and so forth) by a simple manipulation of a remote controller to connect to the DTV through the Internet. In this case, devices in the XHT network include embedded web servers to perform XHT communications.

The embedded web server is a web server that is mounted on small network equipment and has a simple function in comparison to a general web server. That is, the embedded web server may be a kind of software developed for the purpose of mounting to a small network device having a function less demanding of resources, for example, than that of a web server developed for a general computer, such as a personal computer or a workstation.

A web browser connects a built-in system to the Internet so that the system can read a web document. Through this, the system connects to a network system to confirm a present state of a device and the network and to transfer a control command to the network system. That is, a network manager having, for example, a mobile computer connected to the Internet can manage network devices or a network connected to the network devices at any time and in any place.

Referring to FIG. 2, the compression unit 210 substitutes strings including combinations of symbolic characters of different types for strings of a file of a web resource in order to compress the strings. Here, the file of the web resource may include a hypertext markup language (HTML) file and a JavaScript file.

HTML is a language that marks the hypertext originated from the standard generalized markup language (SGML). A grammar includes HTML tags and is generally used to display web pages on the Internet. HTML can be read through a general web browser, and can be transmitted through the hypertext transfer protocol (HTTP). Also, HTML may have various kinds of languages built therein, including the JavaScript to perform simple operations (such as checking of a resident registration number, checking the validity of a credit card, etc.).

The JavaScript is an object-centered strong script language that can be directly built into the HTML page, and can make a dynamic interactive application operable in a web browser. Also, the JavaScript may strengthen the function of the dynamic HTML (DHTML). The syntax of the JavaScript is based on programming languages that can be easily learned, such as C, C++, and Java. In addition, since the JavaScript is an interpreter script language, the JavaScript is less affected by restrictions according to the programming environment in comparison to other languages.

The compression unit 210 can compress a JavaScript function name and variable name of the JavaScript file and tag IDs of the HTML file. For this, the compression unit 210, for example, can read the JavaScript function name and variable name of the JavaScript file and a tag ID pattern of the HTML file by using a regular expression.

FIGS. 4A and 4B are views illustrating examples of regular expressions generally used according to an example embodiment of the present invention. The regular expression is a string that defines a complicated pattern matching and a replacement rule. The regular expression includes a combination of diverse predefined special characters to retrieve a special pattern (or string that satisfies a special condition) included in the file or strings of the JavaScript or HTML file. The regular expression is made by symbols that can be simply expressed by mnemonic values. For example, a single string "." can indicate that "it is matched with a certain single string," and a character "+" can indicate that "an expression having one or more preceding characters."

The regular expression has a function of testing a pattern existing in the string. By using the regular expression, a specified text is identified in a document and may be completely removed or replaced by another text. Also, a partially retrieved string is extracted from the strings based on the pattern coincidence. That is, the regular expression has a function of searching for a specified text from a document or an input field. For example, if old data is required to be removed by searching the entire web site and/or some of the HTML format tags are required to be changed, the regular expression can be used to check whether the old data or HTML format tags exist in a specified file. Using this method, the range of the files being affected is limited to the removed or changed file. Thereafter, by using the regular expression, old data is removed and the tag or tags to be replaced are searched for and changed.

Even in a language that does not support the string process function, the regular expression can be used. For example, VBScript included in Visual Basic has diverse string processing functions, but JavaScript does not have such a function in the same manner as the C language. Several methods that can be used to perform an operation are defined in the string, and a string class performs a function of reporting the number of characters that the string has by providing a length attribute. However, it is insufficient for the string class to perform a diverse character processing function. The regular expression greatly improves the string processing function of JavaScript and processes several strings in a signal expression so that the regular expression can be efficiently used in the VBScript.

FIG. 5 is a view illustrating an example of a regular expression of a function name and a variable name of a JavaScript file and a tag ID of an HTML file according to an example embodiment of the present invention. Referring to FIG. 5, a pattern that corresponds to the function may be in the form of "funcMyFunction08." The related regular expression represents the character range of [A-Z], and searches for a character within the predetermined range. For example, [A-Z] indicates a search for all capital letters from "A" to "Z." Also, indicates a search for preceding characters of a partial expression. For example, "zo*" indicates a search for "z" and "zoo".

By using the regular expressions, such as those illustrated in FIGS. 4A and 4B, the function name and the variable name of the JavaScript file read in the form of a pattern (as shown in FIG. 5) and the string of the tag ID of the HTML file are replaced by combinations of symbol characters of different types. Here, the combination of symbol characters of different types may be a string including a combination of a symbol character of an English character type and a symbol character of a numeral type.

FIG. 6 is a view illustrating examples of symbolic character combinations that can be used as compression variables according to an example embodiment of the present invention. Referring to FIG. 6, the number of symbol character combinations, which for example may include one English character and one numeral, may be 26×10 (See (a) in FIG. 6), and the number of symbol character combinations, which may for example include two English characters and one numeral, may be 27×26×10-26×10 (See (b) in FIG. 6). For example, if the function and variable names of the JavaScript, which are patterned into regular expressions by the compression unit 210 illustrated in FIG. 2, are "funcMyFunction01," "funcMyFunction02," "varMyVariable01," and "varMyVariable02", and the compression variable name used up to now is "c9," they may be replaced by "d0," "d1," "d2," and "d3," respectively.

FIGS. 7A and 7B are views illustrating examples of JavaScript forms before and after the compression is applied according to an example embodiment of the present invention. As illustrated in FIGS. 7A and 7B, the complicated JavaScript function name and variable name have been converted into simple ones after the compression is applied thereto. For example, a compression variable "v8" 71' is substituted for the function name "funcSetCurrentChannel" 71 located in the first line, and "x6" 72' is substituted for the variable name "varProgramTitle" 72.

The storage unit 220 illustrated in FIG. 2 stores compression information of the web resource (i.e., information on the JavaScript function name and variable name, the pattern according to the regular expression of the tag ID of HTML, and the corresponding compression variable name). Here, the storage unit 220 may be implemented by a cache included in the web server 200.

If the web service is requested, the control unit 230 executes the web resource according to the compression information stored in the storage unit 220, and provides the requested web service. The control unit 230 does not provide the JavaScript function name and variable name (i.e., the requested web resource) and the HTML ID as they are, but provides them by using the compression variable, thereby decreasing the response time.

In addition, if the compression information corresponding to the requested web resource is not stored in the storage unit 220, the control unit 230 can control the compression unit 210 to compress the file of the requested web resource.

Figure 8:
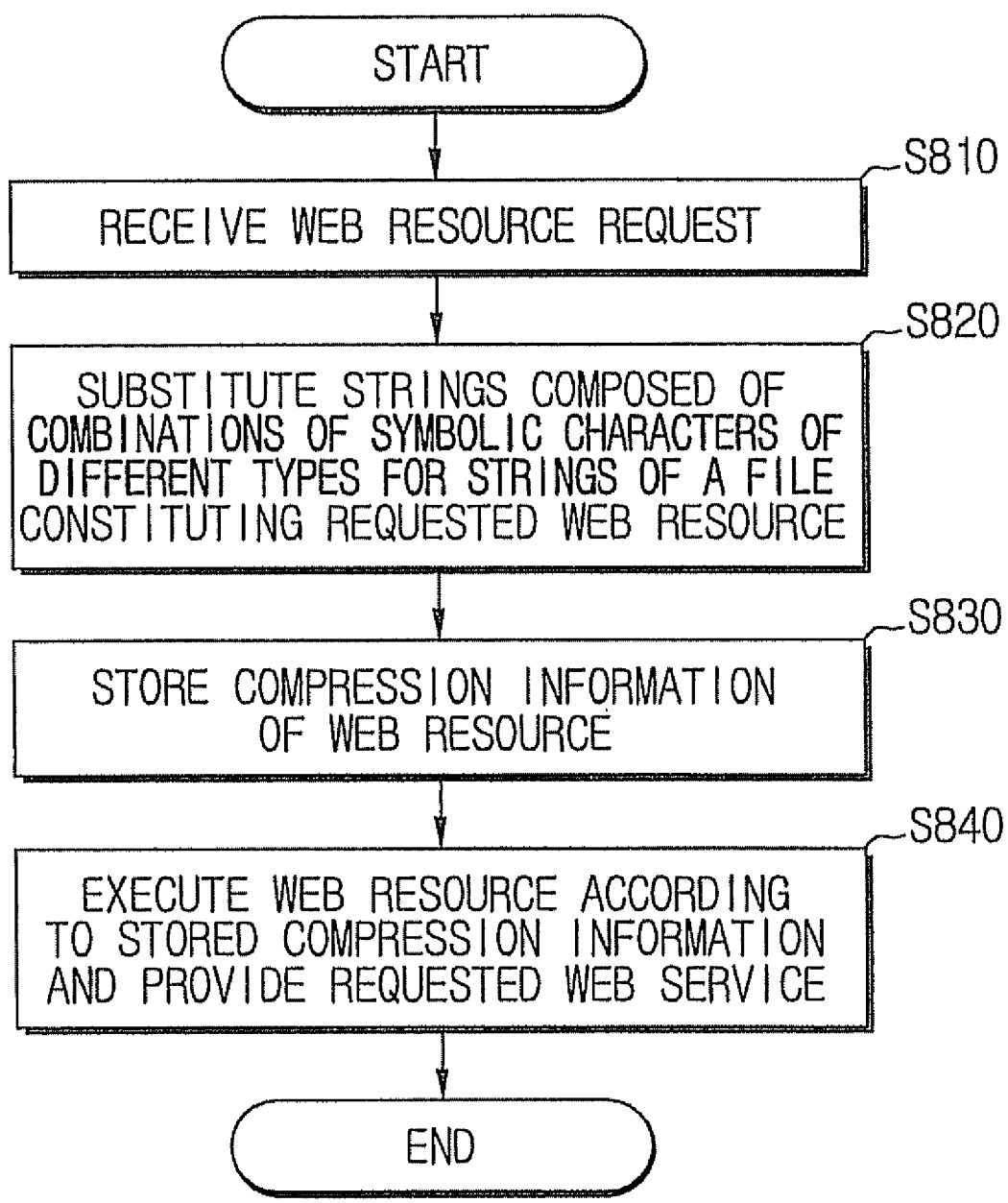
FIG. 8 is a flowchart illustrating a method of providing a web service for a web server according to an example embodiment of the present invention.

FIG. 8 is a flowchart illustrating a method of providing a web service for a web server according to an example embodiment of the present invention. Here, the web server may be an embedded web server built into a device included in the XHT network as shown in FIG. 2.

According to the method of providing a web service as illustrated in FIG. 8, if a web resource request is received in operation S810, strings of a file included in the requested web resource are substituted by strings including combinations of symbolic characters of different types in operation S820. The substituted strings are then compressed.

Here, the file included in the web resource may be at least one of an HTML file and a JavaScript file. Also, the object to be compressed may be the JavaScript function name and variable name that are included in the JavaScript file, and a tag ID that is included in the HTML file.

Then, compression information of the web resource generated in operation S820 is stored in operation S830, and the web resource is executed according to the compression information in order to provide the requested web service in operation S840.

Figure 9:
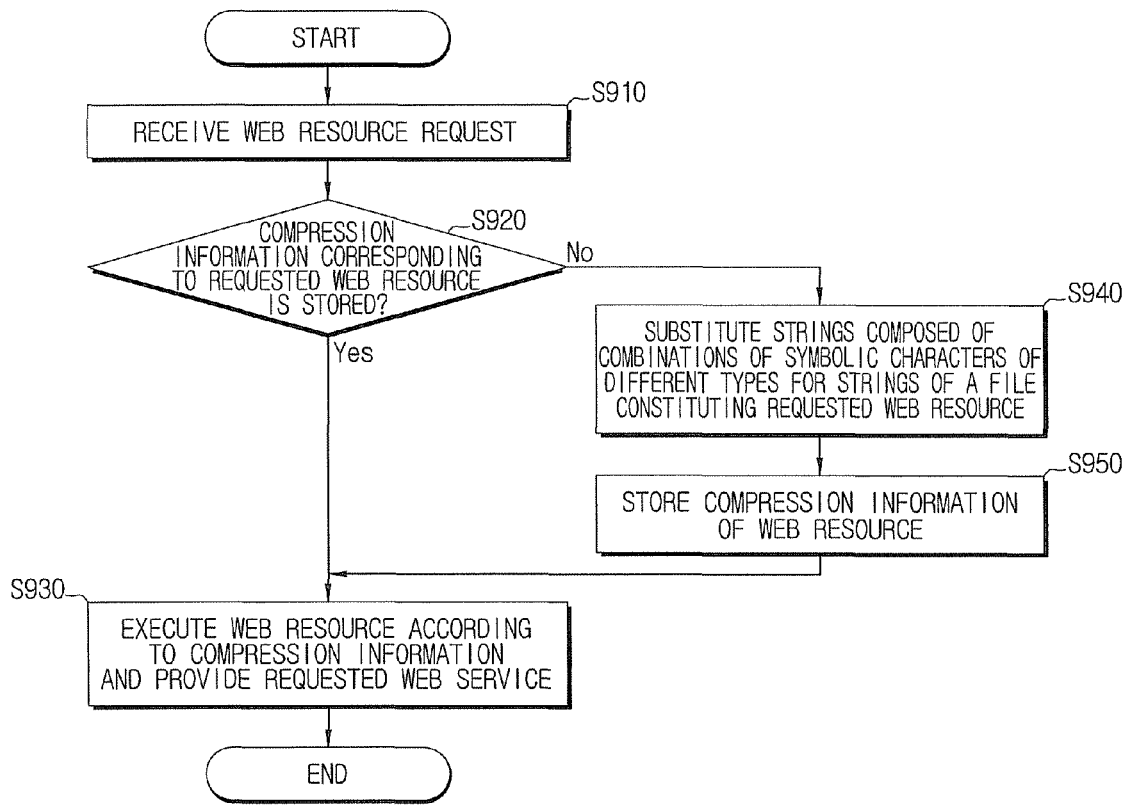
FIG. 9 is a flowchart illustrating a method of providing a web service for a web server according to another example embodiment of the present invention.

FIG. 9 is a flowchart illustrating a method of providing a web service for a web server according to another example embodiment of the present invention. According to the method of providing a web service as illustrated in FIG. 9, if a web resource request is received in operation S910, it is confirmed whether compression information corresponding to the JavaScript function and file and the HTML tag ID read from a file included in the requested web resource is stored in operation S920.

If it is determined in operation S920 that the corresponding compression information is stored, the web resource is executed according to the stored compression information to provide the requested web service in operation S930.

If it is determined in operation S920 that the corresponding compression information is not stored, strings of a file included in the requested web resource are substituted by strings including combinations of symbolic characters of different types in operation S940. The substituted strings are then compressed. For example, the strings of the file can be substituted by strings including combinations of symbolic characters of an English character type and symbolic characters of a numeral type.

Thereafter, the compression information of the web resource (for example, the JavaScript function and variable names, the HTML tag ID, and the corresponding compression variable) are stored in operation S950. Then, the web resource is executed according to the stored compression information to provide the requested web service in operation S930. Accordingly, the response speed of the web server is increased, and an effect of program protection can be sought.

As described above, according to aspects of the present invention, since the size of the text provided by an embedded web server is reduced, the performance of the web server can be improved. Also, the effect of program protection can be sought through the JavaScript compression.

In addition, since the JavaScript is not syntax-analyzed but is progressed in a text matching method, the web server can perform much faster than the generally used JavaScript compression engine. Also, since the pattern matching method is used, functions or variables that should not be substituted are naturally made to deviate from the pattern are thus prevented from being substituted.

Various components of the apparatus as shown in FIG. 2, such as the control unit 230 and the compression unit 210 can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. Software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Accordingly, it is intended, therefore, that the present invention not be limited to the various example embodiments disclosed, but that the present invention includes all embodiments falling within the scope of the appended claims.

What is claimed is:

1. A web server that provides a requested web resource; the web server comprising:
   a compression unit to compress first strings of a file of the web resource by replacing the first strings with second strings including combinations of symbolic characters of different types; and
   a control unit to provide the web resource replaced with the second strings without a further compression operation for the second strings when the web resource is requested,
   wherein the compression unit and/or the control unit is implemented as a hardware component.

2. The web server as claimed in claim 1, further comprising:
   a storage unit to store compression information corresponding to the web resource, the compression information including the second strings, wherein the control unit compresses the web resource according to the stored compression information when the web resource is requested.

3. The web server as claimed in claim 1, wherein the file comprises a JavaScript file.

4. The web server as claimed in claim 1, wherein the file comprises a hypertext markup language (HTML) file and/or a JavaScript file.

5. The web server as claimed in claim 3, wherein the compression unit compresses a JavaScript function name and a variable name included in the JavaScript file.

6. The web server as claimed in claim 4, wherein the compression unit compresses a tag ID included in the HTML file.

7. The web server as claimed in claim 1, wherein the second strings include combinations of symbolic characters of an English character type and symbolic characters of a numeral type.

8. The web server as claimed in claim 1, wherein the web server is an embedded web server included in a device of an expandable home theater (XHT) network.

9. A method of providing a web service for a web server that compresses and provides a requested web resource, the method comprising:
   compressing first strings of a file of the web resource by replacing the first strings with second strings including combinations of symbolic characters of different types in order to compress the first strings; and
   providing the compressed web resource replaced with the second strings without a further compression operation for the second strings when the web resource is requested.

10. The method as claimed in claim 9, further comprising:
    storing compression information corresponding to the web resource, the compression information including the second strings, wherein
    the providing of the compressed web resource comprises compressing the web resource according to the stored compression information when the web resource is requested.

11. The method as claimed in claim 9, wherein the file comprises a JavaScript file.

12. The method as claimed in, claim 11, wherein the replacing of the first strings comprises compressing a JavaScript function name and variable name included in the JavaScript file.

13. The method as claimed in claim 9, wherein the web server is an embedded web server included in a device of an XHT network.

14. A web server that provides a requested web resource, the web server comprising:
    a compression unit to compress first strings of a JavaScript file of the web resource by replacing the first strings with second strings that are smaller than the first strings; and
    a control unit to provide the web resource replaced with the second strings without a further compression of the second strings when the web resource is requested,
    wherein the compression unit and/or the control unit is implemented as a hardware component.

15. The web server as claimed in claim 14, wherein the second strings include combinations of symbolic characters of different types in order to compress the first strings.

16. The web server as claimed in claim 14, wherein the compression unit compresses a JavaScript function name and a variable name included in the JavaScript file.

17. The web server as claimed in claim 14, wherein the compression unit compresses a tag ID included in an HTML file of the web resource.

* * * * *